United States Patent
Carnevale et al.

(10) Patent No.: US 7,212,547 B2
(45) Date of Patent: May 1, 2007

(54) METHOD AND APPARATUS FOR IMPLEMENTING GLOBAL TO LOCAL QUEUE PAIR TRANSLATION

(75) Inventors: Michael Joseph Carnevale, Rochester, MN (US); Charles Scott Graham, Rochester, MN (US); Daniel Frank Moertl, Rochester, MN (US); Timothy Jerry Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 995 days.

(21) Appl. No.: 10/360,252

(22) Filed: Feb. 6, 2003

(65) Prior Publication Data

US 2004/0156395 A1    Aug. 12, 2004

(51) Int. Cl.
*H04J 3/16*    (2006.01)
*H04J 3/22*    (2006.01)

(52) U.S. Cl. ............... 370/469; 370/466; 370/474; 710/22; 711/108

(58) Field of Classification Search ........... 370/401, 370/389, 465, 466, 469, 412–416, 428, 429, 370/474; 710/22, 100; 711/104, 108; 709/213–216
See application file for complete search history.

(56) References Cited

U.S. PATENT DOCUMENTS

| 6,449,695 | B1 | 9/2002 | Bereznyi et al. |
| 2002/0133620 | A1* | 9/2002 | Krause .................. 709/238 |
| 2002/0165899 | A1* | 11/2002 | Kagan et al ............ 709/104 |
| 2003/0058875 | A1 | 3/2003 | Arndt et al. |
| 2003/0065856 | A1* | 4/2003 | Kagan et al. ........... 710/263 |
| 2004/0010594 | A1 | 1/2004 | Boyd et al. |
| 2004/0015622 | A1* | 1/2004 | Avery .................... 710/22 |
| 2004/0128398 | A1* | 7/2004 | Pettey .................... 709/249 |
| 2006/0168086 | A1* | 7/2006 | Kagan et al. ........... 709/207 |

* cited by examiner

*Primary Examiner*—Ajit Patel
(74) *Attorney, Agent, or Firm*—Joan Pennington

(57) ABSTRACT

A method, apparatus, and computer program product are provided for implementing global to local queue pair translation in a network transport layer. A global queue pair number is identified. The global queue pair number is translated to a smaller local queue pair number. The local queue pair number is used for storing local queue pair context data for outbound header generation and inbound header checking. Upper layers of the network protocol above the network transport layer are allowed to use the global queue pair numbers.

16 Claims, 4 Drawing Sheets

200

R1 - PACKET DISSEMBLER 108 RECEIVES PACKET FROM LINK/ PHYSICAL LAYER

R2 - 24 BIT QP NUMBER IS EXTRACTED FROM PACKET AND SENT TO TRANSLATE CAM 104

R3 - 6 BIT LOCAL QP NUMBER IS RETURNED FROM TRANSLATE CAM 104

R4 - PACKET DISSEMBLER 108 USES THE 6 BIT LOCAL QP NUMBER TO ACCESS A LOCAL QP BUFFER, PACKET VALIDATION BEGINS

R5 - IF PACKET IS VALID AND THE OPERATION WAS A WRITE, PAYLOAD DATA IS WRITTEN TO DRAM 114

T1 - POLLING HW 112 DETECTS A PACKET THAT NEEDS TO BE TRANSMITTED

T2 - POLLING HW 112 PROVIDES 24 BIT GLOBAL QP NUMBER AND SIGNALS PACKET BUILDER 106 TO TRANSMIT A PACKET

T3 - 24 BIT QP NUMBER IS SENT TO TRANSLATE CAM 104

T4 - 6 BIT LOCAL QP NUMBER IS RETURNED FROM TRANSLATE CAM 104

T5 - PACKET BUILDER 106 USES THE 6 BIT LOCAL QP NUMBER TO ACCESS A LOCAL QP BUFFER; HEADER INFORMATION, SEQUENCE NUMBER, ETC. ARE READ FROM BUFFER 110

T6 - PAYLOAD DATA IS RETRIEVED FROM DRAM 114 IF A WRITE OPERATION

T7 - PACKET IS SENT TO THE LINK/PHYSICAL LAYERS FOR TRANSMISSION

FIG. 3

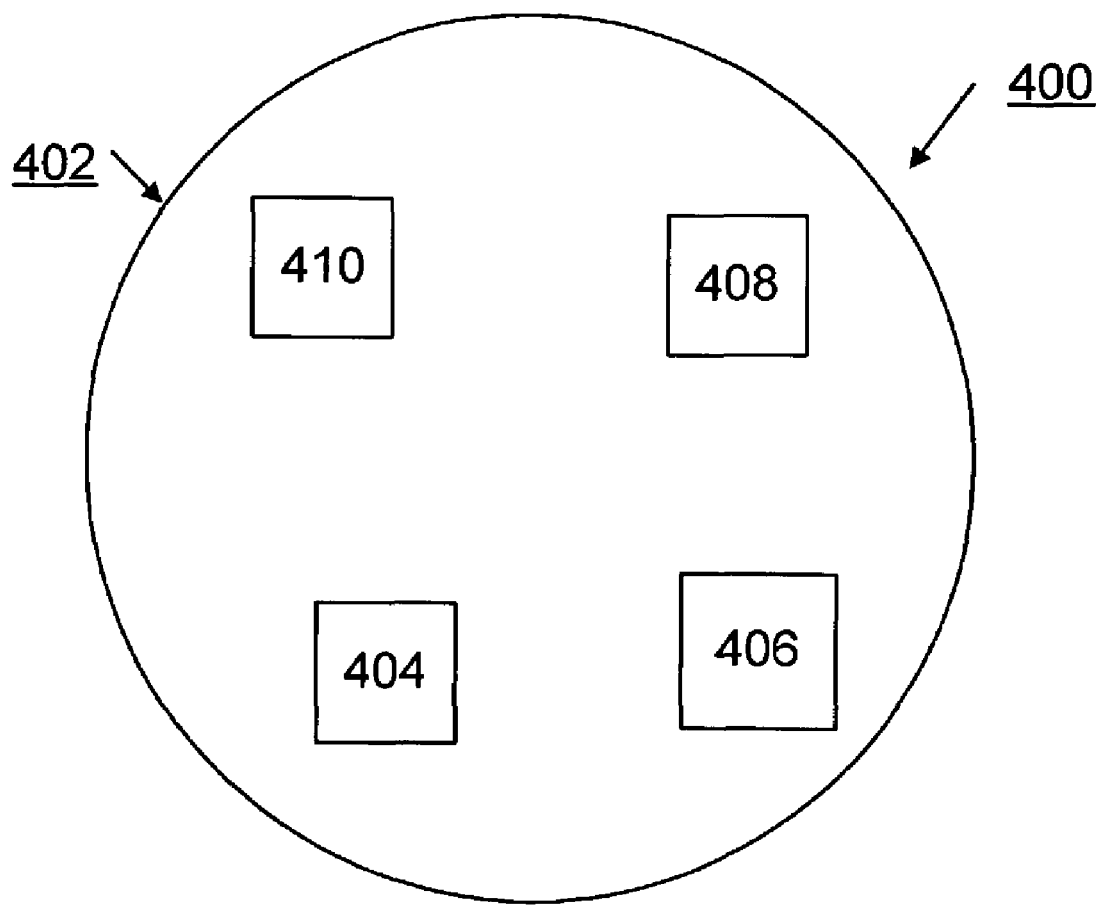

METHOD AND APPARATUS FOR IMPLEMENTING GLOBAL TO LOCAL QUEUE PAIR TRANSLATION

FIELD OF THE INVENTION

The present invention relates generally to the data processing field, and more particularly, relates to a method, apparatus, and computer program product for implementing global to local queue pair translation in a network transport layer.

RELATED APPLICATION

A related U.S. patent application Ser. No. 10/359,777, entitled METHOD AND APPARATUS FOR IMPLEMENTING INFINIBAND TRANSMIT QUEUE by Michael Joseph Carnevale, Charles Scott Graham, Daniel Frank Moertl, and Timothy Jerry Schimke, and assigned to the present assignee is being filed on the same day as the present patent application.

DESCRIPTION OF THE RELATED ART

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. As a result new types of I/O networks have been introduced.

One new type of I/O network is known and referred to as the InfiniBand network. The InfiniBand network replaces the PCI or other bus currently found in computers with a packet-switched network, complete with zero or more routers. A host channel adapter (HCA) couples the processor to a subnet, and target channel adapters (TCAs) couple the peripherals to the subnet. The subnet typically includes at least one switch, and links that connect the HCA and the TCAs to the switches. For example, a simple InfiniBand network may have one switch, to which the HCA and the TCAs connect through links. Various topologies, for example topologies that are more complex, are also possible.

InfiniBand networks can interconnect with communication networks. For instance, an Ethernet network adapter may be installed that enables communication over an Ethernet network, which is a common type of communication network. The network adapter has its own TCA for coupling to an InfiniBand network. The InfiniBand specification provides a raw datagram mode of communication to bridge packets received from an Ethernet network for transmission over an InfiniBand network, and vice-versa.

InfiniBand networks provide for communication between TCAs and HCAs in a variety of different manners. In the InfiniBand network data flows between end nodes on logical connections known as Queue Pairs (QPs) across a switched point-to-point fabric. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

InfiniBand networks allow for a number of different transport services, including reliable and unreliable connections, reliable and unreliable datagrams, and raw packet support. In unreliable connections and datagrams, acknowledgments are not generated, and packet ordering is not guaranteed. In reliable connections and datagrams, acknowledgments and packet sequence numbers for guaranteed packet ordering are generated. Duplicate packets are rejected, and missing packets are detected.

The InfiniBand (IB) architecture allows for 16,777,216 ($2^{**}24$) global Queue Pairs (QPs) to be active at a given time. The transport layer generally requires substantial processing power because the transport layer involves complex operations and the transport layer hardware typically is complex. The upper layers above the transport layer might not support this many QPs but even a small subset of this number can be restrictive if the packets going to or from the IB interface are using a wide span of QP numbers.

A need exists for transport layer hardware that is substantially less complex than conventional arrangements, while providing compliance with particular I/O network requirements, such as the InfiniBand architecture.

SUMMARY OF THE INVENTION

A principal object of the present invention is to provide a method, apparatus, and computer program product for implementing global to local queue pair translation in a network transport layer. Other important objects of the present invention are to provide such method, apparatus, and computer program product for implementing global to local queue pair translation substantially without negative effect and that overcome some of the disadvantages of prior art arrangements.

In brief, a method, apparatus, and computer program product are provided for implementing global to local queue pair translation in a network transport layer. A global queue pair number is identified. The global queue pair number is translated to a smaller local queue pair number. The local queue pair number is used for storing local queue pair context data for outbound header generation and inbound header checking.

In accordance with features of the invention, the global queue pair number is represented by a plurality of bits and the local queue pair number is represented by a sub-plurality of bits. For example, the global queue pair number is represented by 24-bits and the local queue pair number is represented by 6-bits. For example, a content addressable memory (CAM) translates the 24-bit global queue pair number into a 6-bit local queue pair number. A high-speed internal random access memory (RAM) within the network transport layer provides a local queue pair context buffer for each local queue pair. Upper layers of the network protocol above the network transport layer are allowed to use the global queue pair numbers.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, and 3 are diagrams respectively illustrating receive operations and transmit operations of the transport layer apparatus of FIG. 1 in accordance with the preferred embodiment; and FIG. 4 is a block diagram illustrating a computer program product in accordance with the preferred embodiment.

DETAILED DESCRIPTION OF THE PREFERRED EMBODIMENTS

Figure 1:
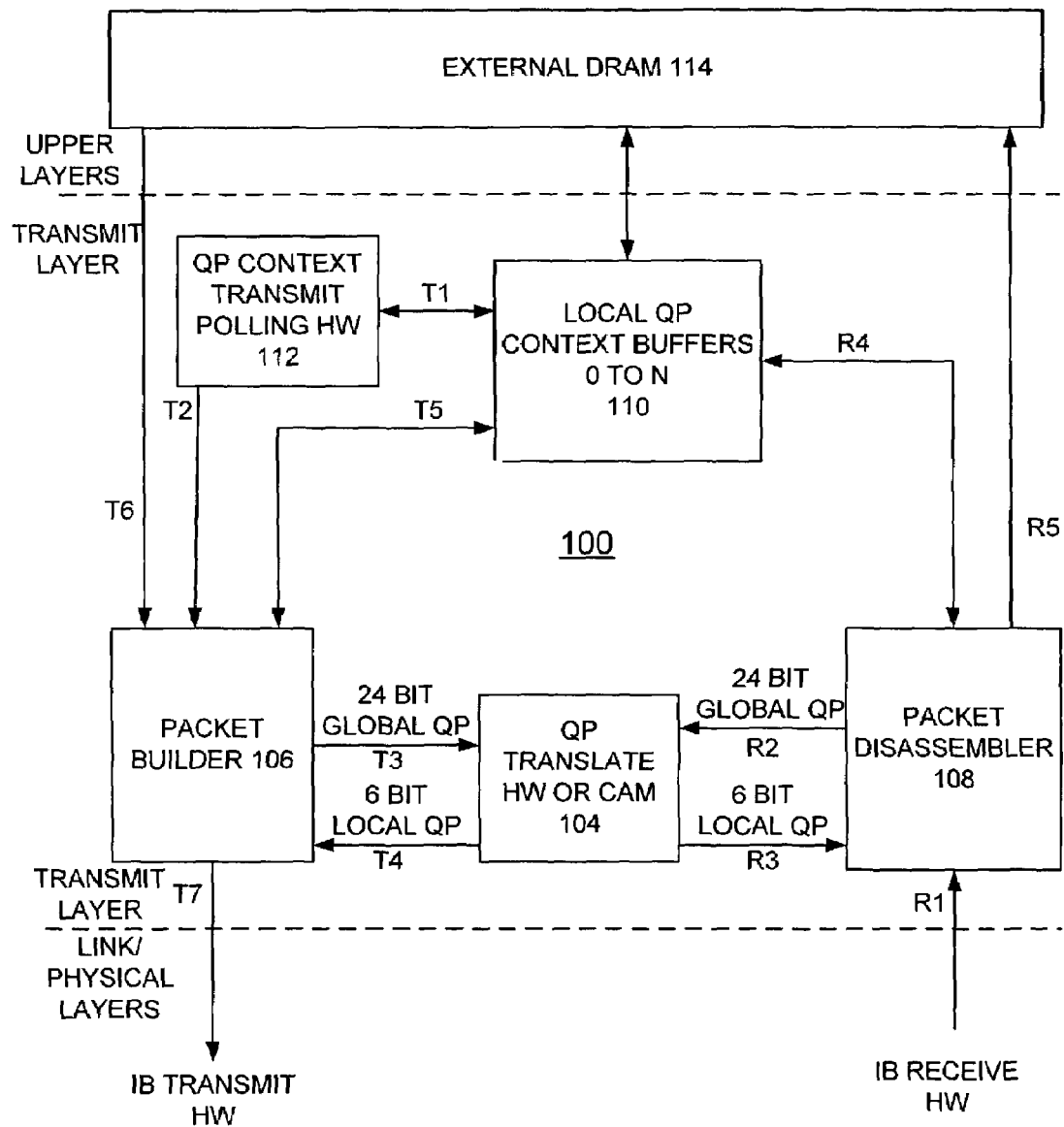
FIG. 1 is a block diagram representation illustrating a transport layer system for implementing methods for global to local queue pair translation in accordance with the preferred embodiment.

In accordance with features of the invention, a new concept is provided referred to as local queue pairs (QPs). The local QPs are used to increase performance and availability of a transport layer of networks, such as, InfiniBand networks. The local QPs are used for processing outbound and inbound IB packets. The global QP is represented by a 24-bit number since there are 16,777,216 possible global QPs. Global QPs are translated to local QPs that are represented, for example, by a 6-bit number.

Having reference now to the drawings, in FIG. 1, there is shown a transport layer or system generally designated by the reference character 100 for implementing methods for global to local queue pair translation in accordance with the preferred embodiment.

As shown in FIG. 1, the transport layer 100 includes a queue pair (QP) translate hardware (HW) or content addressable memory (CAM) 104 connected to a packet builder 106 and a packet disassembler 108. QP translate HW or CAM 104 translates a global QP to local QP. Packet builder 106 is coupled to InfiniBand (IB) transmit hardware and the packet disassembler 108 is coupled to IB receive hardware. A plurality of local QP context buffers 110, 0 to N is coupled to the packet builder 106 and the packet disassembler 108. QP context transmit polling hardware 112 is coupled to the local QP context buffers 110, 0 to N and to the packet disassembler 108. An external dynamic random access memory (DRAM) 114 is coupled to the local QP context buffers 110, 0 to N and to both the packet builder 106 and the packet disassembler 108.

In accordance with features of the preferred embodiment, the QP translate HW or CAM 104 is used to translate a 24 bit global QP number into a 6 bit local QP number, and the function provided by the CAM 104 is further used to increase performance and availability by improving the overall utilization of the local QPs.

In accordance with features of the preferred embodiment, a performance benefit is provided with the transport layer 100 supporting a limited number of local QPs but the upper layers of the protocol are still allowed the freedom to use 2**24 QP numbers. Performance is enhanced by having the high-speed local QP context buffer 110, such as an internal random access memory (RAM), for each local QP that is closely coupled to the transport layer 100. Data for outbound header generation and inbound header checking, along with payload source and destination buffers pointers advantageously are stored in the local QP context buffer 110 on a local QP basis. For example, the local QP context buffer 110 includes a 256-byte internal buffer for each of the local QPs that are supported. The current embodiment supports, for example, 64 local QPs or buffers but the number of local QPs is not limited to this example and the number of local QPs advantageously is selected based upon a function of available silicon area versus desired cost.

Referring also to FIGS. 2, and 3, there are shown respective receive operations and transmit operations of the transport layer 100 in accordance with the preferred embodiment. In FIG. 2, receive operations for inbound packets are shown.

The packet disassembler 108 receives a packet from the IB interface indicated at a line labeled R1 in FIG. 1 and extracts the 24 bit global QP number from one of the packet headers. The packet disassembler 108 accesses the QP translation HW or CAM 104 sending the 24 bit QP indicated at a line labeled R2 in FIG. 1. A 6 bit local QP number is returned by the QP translation CAM 104 to the packet disassembler 108 indicated at a line labeled R3 in FIG. 1. This 6 bit vector is then used to select the local QP Context buffer 110 indicated at a line labeled R4 in FIG. 1 and the packet disassembler 108 can then proceed to accept and process the new packet. The local QP Context buffers 110 contain all the appropriate fields that are needed to accept sequentially increasing packet numbers without the transport layer HW 100 accessing the slower or lower performance wise external DRAM 114, except to store payload data. If the packet is valid and the operation was a write, payload data is written to the DRAM 114 indicated at a line labeled R5 in FIG. 1. The DRAM location to store payload data is pointed to by a field in the local QP Context buffer 110. The storing of payload data to the performance-wise slower external DRAM is acceptable because this is a burst access which is more efficient than smaller accesses which is what the packet disassembler 108 is doing when it is accessing the local QP context buffer 110 during header verification checking, where the packet disassembler 108 is verifying that the packet is valid, has the right packet sequence number, and the like.

In FIG. 3, transmit operations for outbound packets are shown. QP context transmit polling hardware 112 detects a packet that needs to be transmitted indicated at a line labeled T1 in FIG. 1. QP context transmit polling hardware 112 signals the packet builder 106 to build a number of packets for a global QP indicated at a line labeled T2 in FIG. 1. The packet builder 106 accesses the QP translation CAM 104 sending the global QP number indicated at a line labeled T3 in FIG. 1. As indicated at a line labeled T4 in FIG. 1, a 6 bit local QP number is returned by the QP translation CAM 104 to the packet builder 106. As indicated at a line labeled T5 in FIG. 1, the packet builder 106 then uses this 6 bit local QP or 6-bit vector to select a particular local QP context buffer 0–N, 110 and header information, sequence numbers and the like are read from the particular buffer. The packet builder 106 can proceed to build the desired number of packets. The local QP context buffers 110 contain all the appropriate fields that are needed to build sequentially increasing packet numbers without the transport layer HW 100 accessing the performance-wise slower external DRAM 114, except to retrieve payload data indicated at a line labeled T6 in FIG. 1. The DRAM location of the payload data is pointed to by a field in the local QP context buffer 110. The retrieval of payload data from the slower, external DRAM 114 is acceptable because this is a burst access and is more efficient than smaller accesses performed by the packet builder 106 when accessing the local QP Context buffer 110 during packet header generation. The packet is sent to the link/physical layers for transmission indicated at a line labeled T7 in FIG. 1.

This invention as described with 6-bit local QP numbers allows 64 active local QPs, each local QP can be using any of the 2**24 global QP numbers. An individual QP is often closed down, and then later another is started up. However, there may still be packets in flight, also known as stale packets, in the network that are destined for this QP when it is closed down. If this QP is immediately restarted then the adapter may receive these stale packets destined for the old QP number that causes difficulty for the new QP. To handle this problem the infiniBand architecture specifies that the QP must be held in an idle state known as Time Wait to allow these packets to be flushed through the network. The amount of time a QP is required to remain in the Time Wait state is a property of that QP and varies dependent on the size of the network and the path taken through the network for this QP. This requires that the firmware keep a number of timers to determine when each connection (QP) can be reused, and also results in hardware resources, limited in number and very valuable, being unavailable for use during this idle state time.

In accordance with features of the invention, instead when a local QP is closed down the global QP number can be temporarily retired, and a unique global QP number can be assigned to one of the 64 local QPs. Firmware could rotate in this manner through all 2**24 global QP numbers before reusing a number. Any stale packets will be quietly dropped since the global QP number in them does not match any currently active local QPs.

In accordance with features of the invention, the hardware resources associated with a QP are always available, having no forced idle time, and the requirements placed upon firmware are simplified. While full compliance with the InfiniBand architecture is provided, because the old global QP is effectively kept idle until all 2**24 global QP numbers are cycled through.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for global to local queue pair translation of the preferred embodiment in the transport layer system 100 of FIG. 1.

A sequence of program instructions or a logical assembly of one or more interrelated modules defined by the recorded program means 404, 406, 408, 410, direct the transport layer system 100 for implementing global to local queue pair translation of the preferred embodiment.

While the present invention has been described with reference to the details of the embodiments of the invention shown in the drawing, these details are not intended to limit the scope of the invention as claimed in the appended claims.

What is claimed is:

1. A method for implementing global to local queue pair translation in a network transport layer comprising the steps of:
    identifying a global queue pair number;
    translating said global queue pair number to a smaller local queue pair number; and
    storing local queue pair context data for outbound header generation and inbound header checking using said local queue pair number.

2. A method as recited in claim 1 wherein the step of storing includes the step of providing an internal random access memory (RAM) within the network transport layer to provide a local queue pair context buffer for each said local queue pair number.

3. A method as recited in claim 1 includes the step of providing an external dynamic internal random access memory (DRAM) for storing payload data in an upper layer of the network protocol above the network transport layer.

4. A method as recited in claim 3 includes the step of using said global queue pair numbers in said upper layer of the network protocol above the network transport layer.

5. A method as recited in claim 1 wherein said global queue pair number is represented by a plurality of bits and said local queue pair number is represented by a sub-plurality of bits.

6. A method as recited in claim 1 wherein the step of translating includes the step of providing a content addressable memory (CAM) to translate said global queue pair number into said local queue pair number.

7. Apparatus for implementing global to local queue pair translation in a network transport layer comprising:
    a packet disassembler coupled to a network receive hardware;
    a packet builder coupled to a network transmit hardware;
    queue pair translate hardware coupled to said packet disassembler and said packet builder; said queue pair translate hardware identifying a global queue pair number and translating said global queue pair number to a smaller local queue pair number; and
    local queue pair context buffers coupled to said packet disassembler and said packet builder; said local queue pair context buffers storing local queue pair context data for outbound header generation and inbound header checking using said local queue pair number.

8. Apparatus as recited in claim 7 wherein said queue pair translate hardware includes a content addressable memory (CAM) used to translate said global queue pair number into said local queue pair number.

9. Apparatus as recited in claim 7 wherein said local queue pair context buffers includes an internal random access memory (RAM) within the network transport layer to provide a local queue pair context buffer for each local queue pair number.

10. Apparatus as recited in claim 9 wherein said local queue pair number is used to select said local queue pair context buffer.

11. Apparatus as recited in claim 7 includes an external dynamic random access memory (DRAM) for storing payload data in an upper layer of the network protocol above the network transport layer.

12. Apparatus as recited in claim 11 wherein said global queue pair numbers are used in said upper layer of the network protocol above the network transport layer.

13. Apparatus as recited in claim 7 wherein each said global queue pair number is represented by a plurality of bits and each said local queue pair number is represented by a sub-plurality of bits; and wherein a unique global queue pair number is assigned to one of said local queue pair numbers.

14. A computer program product for implementing global to local queue pair translation in a network transport layer system, said computer program product including a plurality of computer executable instructions stored on a computer readable medium, consisting one of a floppy disk, CD-ROM and a tape wherein said instructions, when executed by the transport layer system, cause the transport layer system to perform the steps of:
    identifying a global queue pair number;
    translating said global queue pair number to a smaller local queue pair number; and
    storing local queue pair context data for outbound header generation and inbound header checking using said local queue pair number.

15. A computer program product as recited in claim 14 wherein said translating step includes the steps of assigning a unique global queue pair number to one of a plurality of said local queue pair numbers.

16. A computer program product as recited in claim 14 wherein said storing step includes the steps of providing a local queue pair context buffer for each said local queue pair number and using said local queue pair number to select said local queue pair context buffer.

* * * * *